United States Patent
Jin et al.

(10) Patent No.: US 8,630,152 B2
(45) Date of Patent: Jan. 14, 2014

(54) 3-D SELF-FOCUSING GAP PLASMON GENERATOR FOR TAMR

(75) Inventors: Xuhui Jin, San Jose, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 105 days.

(21) Appl. No.: 12/802,082

(22) Filed: May 28, 2010

(65) Prior Publication Data
US 2011/0292537 A1 Dec. 1, 2011

(51) Int. Cl.
*G11B 11/00* (2006.01)
(52) U.S. Cl.
USPC ........................................................ 369/13.01
(58) Field of Classification Search
None
See application file for complete search history.

(56) References Cited

U.S. PATENT DOCUMENTS

| | | | |
|---|---|---|---|
| 7,042,810 B2 | 5/2006 | Akiyama et al. | |
| 7,359,598 B2 | 4/2008 | Kim et al. | |
| 2008/0192376 A1 | 8/2008 | Tanaka et al. | |
| 2008/0198496 A1 | 8/2008 | Shimazawa et al. | |
| 2009/0116804 A1 | 5/2009 | Peng et al. | |
| 2010/0046331 A1* | 2/2010 | Takayama et al. | 369/13.33 |
| 2010/0103553 A1* | 4/2010 | Shimazawa et al. | 360/59 |
| 2010/0149930 A1* | 6/2010 | Komura et al. | 369/13.33 |
| 2010/0202256 A1* | 8/2010 | Ito et al. | 369/13.33 |
| 2011/0149426 A1* | 6/2011 | Araki et al. | 360/59 |
| 2011/0235478 A1* | 9/2011 | Komura et al. | 369/13.24 |

OTHER PUBLICATIONS

"Gap Plasmon Polariton Structure for Very Efficient Micro to Nano Scale Interfacing," by Pavel Ginzburg et al., Department of Electrical Engineering, Micorphotonics lab, Technion—Israel Institute of Technology, Haifa 3200, Israel, 10 pages.
"Compressing surface plasmons for nano-scale optical focusing," by Hyeunseok Choi et al., Optics Express 7519, vol. 17, No. 9, Apr. 27, 2009, (c) 2009 OSA, 6 pages.
"Adiabatic and nonadiabatic nanofocusing of plasmons by tapered gap plasmon waveguides," by D. F. P. Pile et al., Applied Physics Letters 89, 041111 (2006), pp. 1-3.

\* cited by examiner

*Primary Examiner* — Adam R Giesy
*Assistant Examiner* — Henok Heyi
(74) *Attorney, Agent, or Firm* — Saile Ackerman LLC; Stephen B. Ackerman (57) ABSTRACT

A device for implementing thermally assisted magnetic recording, using a TE mode laser diode, and method for using it, are described. This device is shaped internally so as to provide three-dimensional self-focusing of plasmon radiation, thereby improving the coupling efficiency between the optical wave-guide and the plasmon generator as a result of ensuring a large overlap between these two modes.

20 Claims, 11 Drawing Sheets

3-D SELF-FOCUSING GAP PLASMON GENERATOR FOR TAMR

FIELD OF THE INVENTION

The invention relates to the general field of perpendicular magnetic recording, particularly when thermally assisted, with special reference to the design and use of a plasmon generator for achieving this.

BACKGROUND OF THE INVENTION

Thermally assisted magnetic recording (TAMR) is expected to be capable of recording at 1~10 Tb/inch$^2$ data density. TAMR converts optical power into localized heating of the magnetic recording medium to temporarily reduce the field needed to switch the magnetizations of the grains that comprise the medium. Through a steep temperature gradient alone, or in conjunction with a high magnetic field gradient, data storage density can be improved to well beyond the current state-of-the-art magnetic recording technology.

A TAMR head, in addition to the conventional magnetic recording features, usually comprises an optical wave-guide (WG) and a Plasmon antenna (PA) or Plasmon generator (PG). The WG acts as an intermediate path to guide an external laser light to the PA or PG, where the light optical mode couples to the local Plasmon mode of the PA or to the propagating Plasmon mode of the PG. The optical energy, after being transduced to Plasmon energy, either with local Plasmon excitation in the PA or with energy transmission along the PG, is then concentrated at the location where medium heating happens. TAMR can be achieved when the heated spot is correctly aligned relative to the magnetic field from the magnetic recording structures.

Figure 1A:
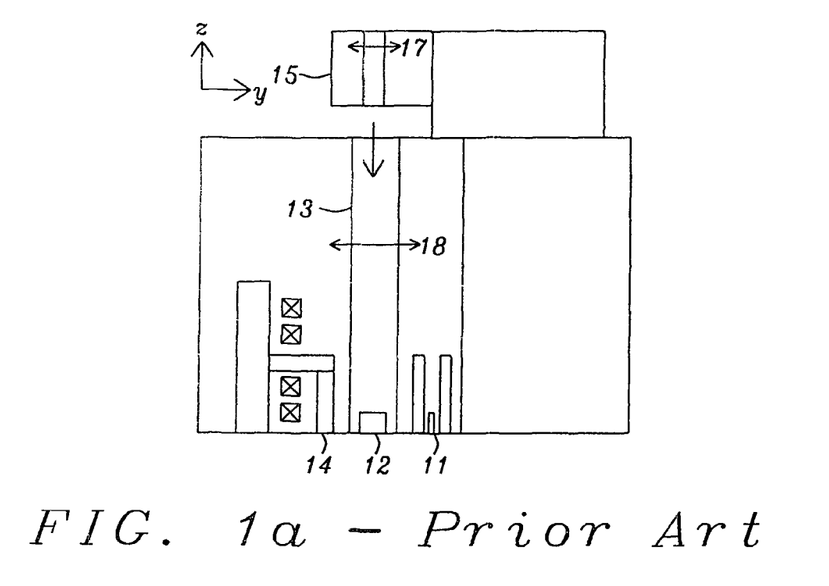
FIGS. 1a-1c show a prior art system for TAMR
Figure 1B:
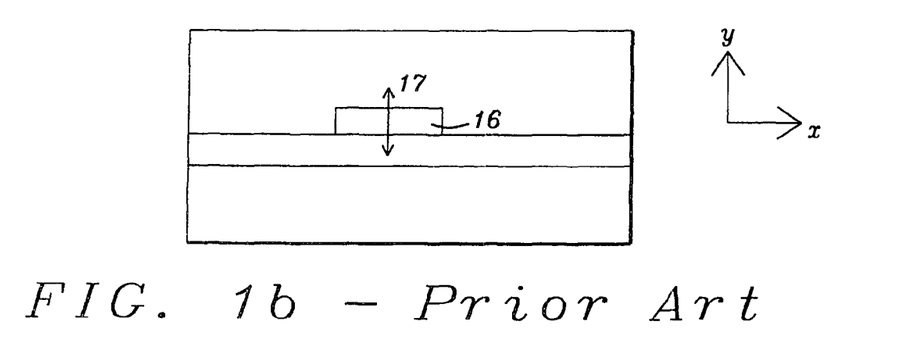
Figure 1C:
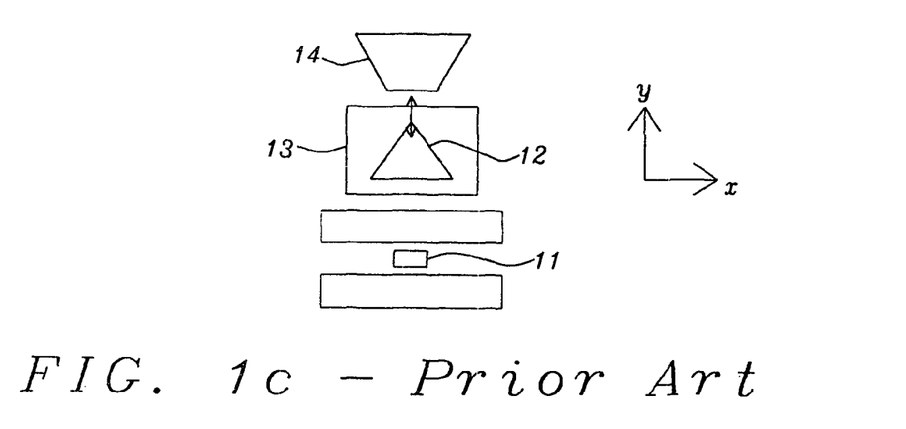

Prior art [1-2] proposals for a head structure to realize TAMR are shown in cross-section in FIG. 1a, with an ABS view in FIG. 1c while FIG. 1b shows the laser diode as seen when looking up from the slider. Seen in these figures is magnetic read head 11, PA (or PG) 12, optical wave-guide (WG) 13, write pole 14 and laser diode (LD) 15 that is mounted on the top of the slider by a fixture. The beam emitted by laser diode 15 emerges from internal wave-guide 16, is polarized along direction 17 and couples into WG mode in the slider. The PG needs to be initiated by the correct edge plasmon (EP) mode i.e. one in which the major electric field component 17 is along the y-direction, as shown in FIG. 1a, in order to be able to confine the optical energy at the end of the sharp tip. For this purpose, both the WG and LD optical modes should also have the correct polarization, which is again along the y-direction.

In other words, LD 15 needs to be operated in the transverse magnetic (TM) mode. LDs are not usually designed and fabricated for operation in the TM mode and their cost is often higher than that of LDs operating in the more commonly used transverse electric (TE) mode (whose polarization is in the x-direction). Since it is normally preferred to operate in the cheaper LD mode, the invention discloses a novel and efficient plasmon generator suitable for operating in conjunction with the more common TE mode LD.

Other critical limitations to the achievement of high optical efficiency have been documented in the prior art. First, the efficiency of coupling WG light into the edge plasmon mode is limited by mode size mismatch between the diffraction-limited optical mode in the WG and the sub-diffraction-limited edge plasmon mode in the PG. Because the WG mode is much larger than the highly confined edge plasmon mode, only a small fraction of the optical energy can be transferred.

Second, propagation loss of the edge plasmon mode along the PG can be significant due to the high confinement of the edge plasmon mode. Third, the coupling and propagation efficiencies of the edge plasmon mode tend to be very sensitive to edge variations in PG 12, so tight fabrication tolerance is required. Fourth, the plasmon antenna or the PG tend to be isolated and of limited volume so thermal management of these components to avoid heat damaging them could be challenging. The present invention discloses how the overall optical efficiency of the plasmon device can be improved so that less laser power will be consumed in the TAMR head.

In a recent paper by Ginzburg et al. [3], a three-section structure is described. However, radiation propagating through it is not compressed in a direction normal to the plane in which these three sections lie, so only (conventional) 2-D focusing is provided. Also, the authors use the terms 'TM' and 'TE' (to define modes) differently from their usage in the present invention. In our case, for example, the TM mode has its dominant electric field component (i.e. its plane of polarization in the optical sense) perpendicular to the diode film stack, i.e. parallel to the film's original growth direction (see direction 17 in FIGS. 1a and 1b) with the in-plane of polarization for the TE mode being parallel to said stack. The diode stack's original growth direction is relevant because it determines the distribution of internal stress in the laser diode.

[1] K. Tanaka, K. Shimazawa, and T. Domon, "Thermally assisted magnetic head," US Patent Pub. #2008/0192376 A1 (2008)

[2] K. Shimazawa, and K. Tanaka, "Near-field light generator plate, thermally assisted magnetic head, head gimbal assembly, and hard disk drive," US Patent Pub. #2008/0198496 A1 (2008)

[3] P. Ginzburg, D. Arbel, and M. Orenstein, "Gap plasmon polariton structure for very efficient microscale-to-nanoscale interfacing," Opt. Lett. 31, 3288-3290 (2006)

A routine search of the prior art was performed with the following references of interest being found:

In US 2009/0116804, Peng et al. disclose a plasmon generator having TE mode while Kim et al. describe a plasmon generator having a gap in US 2005/0062973. U.S. Pat. No. 7,042,810 (Akiyama et al.) teaches a laser oscillated in TE mode in TAMR while US 2008/0192376 (Tanaka et al.) and US 2008/0198496 (Shimazawa et al) disclose plasmon antennas having a triangle shape.

SUMMARY OF THE INVENTION

It has been an object of at least one embodiment of the present invention to provide an apparatus for thermally assisted magnetic recording using a TE mode laser diode.

Another object of at least one embodiment of the present invention has been to provide said apparatus with three dimensional self-focusing, thereby improving the coupling efficiency between the optical wave-guide and the plasmon generator as a result of ensuring a large overlap between the two modes.

Still another object of at least one embodiment of the present invention has been to achieve better thermal dissipation in the plasmon generator by providing a large volume of the metal film.

A further object of at least one embodiment of the present invention has been to facilitate placement and alignment of the hot spot formed in the recording medium, relative to the perpendicular write pole.

These objects have been achieved by the use of a Gap Plasmon Generator having a shape that is efficiently coupled to an optical waveguide, making it easier to use a TE polarized laser diode.

This common TE mode edge emission laser diode is placed on a slider and its beam aligned for optimum entry into the optical wave-guide. Then a Gap Plasmon Generator is positioned nearby so that it is efficiently coupled to receive energy from the wave-guide by virtue of the fact that energy passing down both these devices is polarized in the same plane.

A key feature of the invention is the Self-focusing Gap Plasmon Generator (SGPG) which has 3-D self-focusing capability due to its novel shape. This SGPG is made up of three sections: a first straight section which receives the optical energy from the wave-guide (through either edge or direct, butted coupling), a second section which further condenses the GP in the lateral direction as it propagates towards the ABS; and a third section (which could be straight or tapered), from which the highly confined energy emerges a very short distance from the recording medium.

Additionally, the internal sidewalls of the SGPG slope inwards, giving them a trapezoidal shape at both the entrance and at the ABS. Because of this asymmetric shape in the y-direction, the gap plasmons will be condensed as they propagate along the z-direction. At the ABS the narrower gap side is placed as close as possible to the edge of the perpendicular magnetic pole.

The structure of the invention has a higher optical efficiency than a Gap Plasmon Generator having a uniform cross-section normal to the z-direction because of 1) the larger overlap between the WG and GP modes in the entrance section, 2) adiabatic focusing and condensing of the GP by the second section's tilted metal walls, and 3) a reduced propagation loss since most of the optical energy is in the dielectric gap.

BRIEF DESCRIPTION OF THE DRAWINGS

FIGS. 5a-7b show simulation results (FEM and FDTD) that confirm the advantages claimed for the present invention over the prior art.

FIGS. 8a-10c illustrate three embodiments of the invention that differ in how radiation from the optical wave-guide is coupled into the PG.

DESCRIPTION OF THE PREFERRED EMBODIMENTS

Figure 2A:
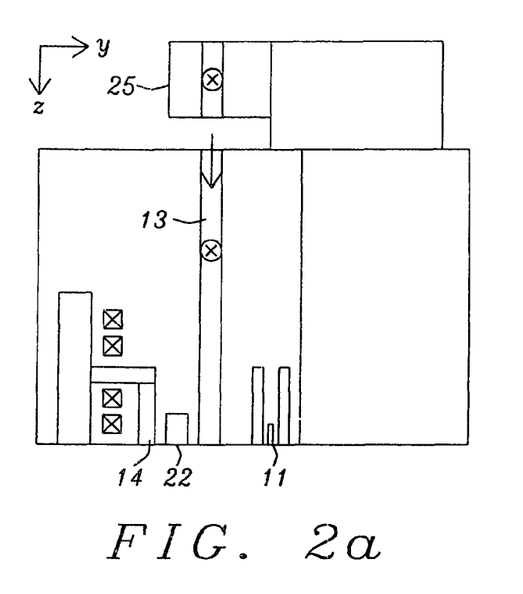
FIGS. 2a-2c show three views of the structure of the present invention.
Figure 2B:
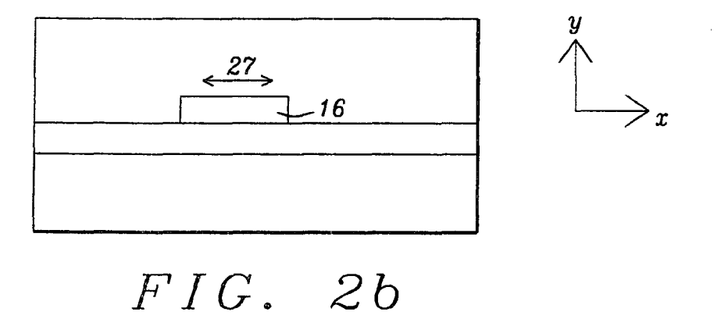
Figure 2C:
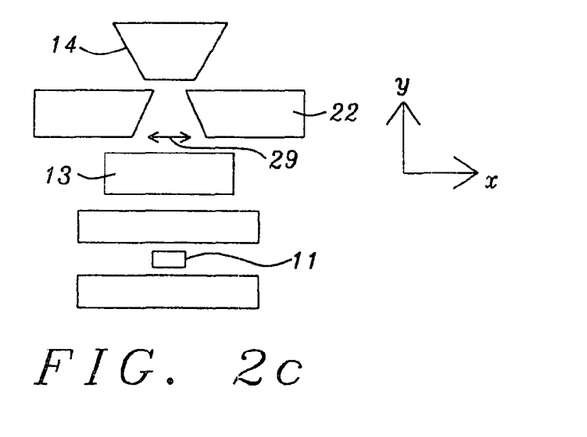

The invention discloses a method wherein a Gap Plasmon Generator (GPG) makes it easier to use a TE polarized laser diode. Said GPG has a shape that facilitates efficient coupling to the waveguide light through self-focusing. FIG. 2a shows, in schematic view, the appearance of a TAMR head that utilizes the invention, with an ABS view in FIG. 2c while FIG. 2b shows the laser diode as seen when looking up from the slider. Standard edge emission TE mode laser diode 25 is placed on the top of the slider. The polarization direction 27 of emitted laser beam is along the x-axis perpendicular to the film growth direction of the laser diode. However, when waveguide WG 13 is excited in the TE mode the polarization of the radiation in this mode is still along the x-direction (perpendicular to the thin film growth direction of the slider). This has been achieved, as shown in FIGS. 2a and 2c, by placing GPG 22 near waveguide 13 to couple the optical energy from the waveguide mode to a gap Plasmon mode efficiently as the polarization 29 in the gap Plasmon mode is also along the x-direction.

The Self-focusing Gap Plasmon Generator (SGPG) has a 3-D self-focusing capability due to its engineered shape. As shown in FIG. 3c, which is a plan view, the SGPG comprises three sections: first straight section S1 which couples WG light into Gap Plasmon (GP) radiation that propagates in the dielectric gap (composed of materials such as TaOx, $Al_2O_3$, SiON, or MgO) positioned between two areas of a metal such as aluminum, gold, silver or any of their alloys; a second section S2, which further condenses the GP in the lateral direction as it propagates towards the ABS; and a third section S3 (which could be straight or tapered), which further delivers the energy from its highly confined area to the recording medium located underneath the SPG.

Figure 3A:
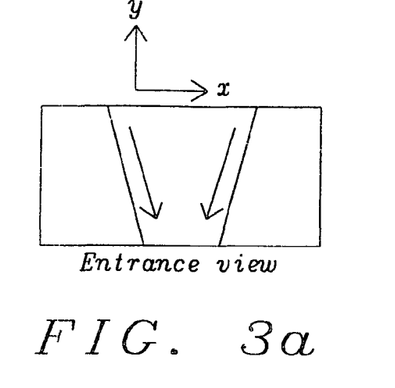
FIGS. 3a-3d give details of the Self-focusing Gap Plasmon Generator (SGPG) that show how 3-D focusing of plasmon radiation is achieved.
Figure 3B:
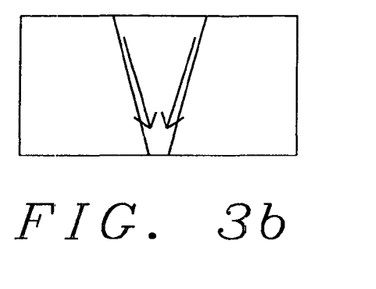
Figure 3C:
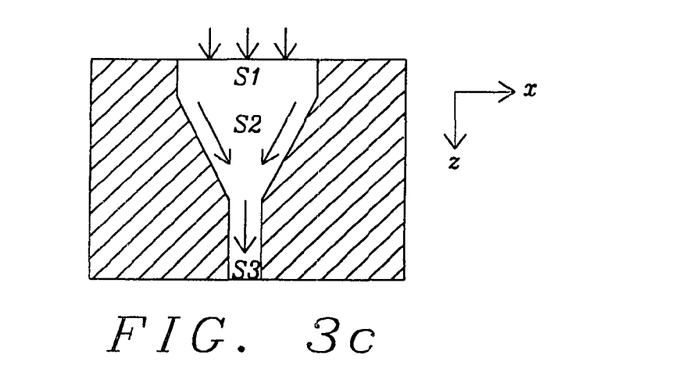

The cross-sectional views FIGS. 3a and 3b, show how the internal sidewalls of the SPG slope inwards, giving them a trapezoidal shape at both the entrance and the ABS, respectively. Due to the asymmetric shape in the y-direction, GP will be condensed towards the narrower side as it propagates along the z-direction. At the ABS, whether the SPG has a trapezoidal, triangular or rectangular shape, the optical energy is now confined within an area that is far smaller than an optical diffraction-limited spot. Also, it is located at the narrower gap side, which enables it to be extremely close to the edge of magnetic write pole 14 (see FIG. 2c).

Figure 3D:
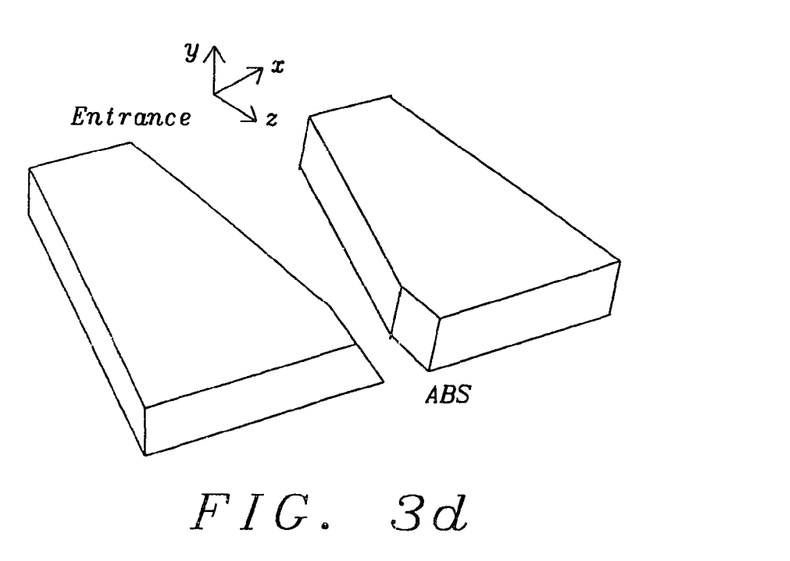

In FIG. 3d we show an isometric (3D) view of section S2 to illustrate how the radiation is simultaneously compressed in both the Y and Z directions.

Figure 4A:
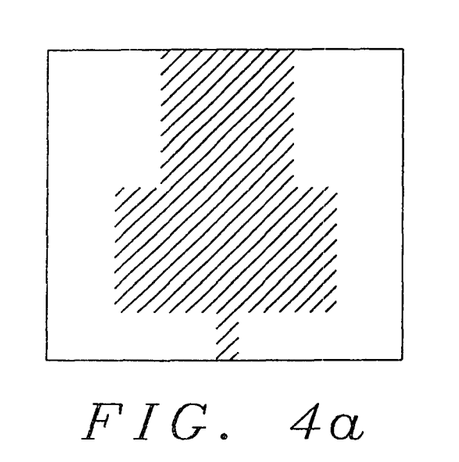
FIGS. 4a-4c show three (of many possible) layouts for the SGPG in the XZ plane.

In the XZ plane, the cross-section of the SGPG may be shaped to further improve the overall efficiency of the device:

For example, as shown in FIG. 4a, retaining the terminology used to describe FIG. 3c, S1 has parallel sides spaced between 0.1 and 1 microns apart and extending from 0.05 to 2 microns in the Z direction. S2 also has parallel sides but these are spaced between 0.2 and 1.6 microns apart and extend from 0.1 to 2 microns in the Z direction, enabling it to function as a gap plasmon resonator. In S3, the parallel sides are spaced between 0.01 and 0.1 microns apart and extend all the way to the ABS (for up to 0.2 microns).

Figure 4B:
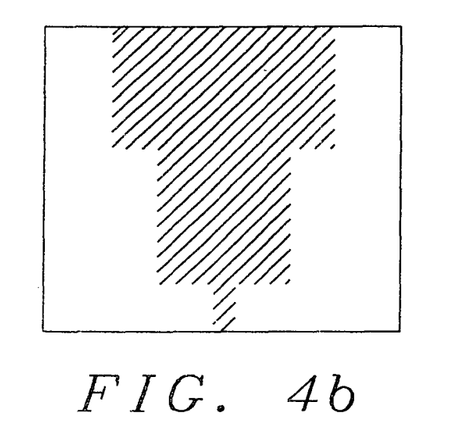

The version shown in FIG. 4b is similar to what is shown in FIG. 4a but the dimensions for S2 in 4a are used for 51 in 4b (and similarly S2 in 4b has the dimensions of S1 in 4a).

Figure 4C:
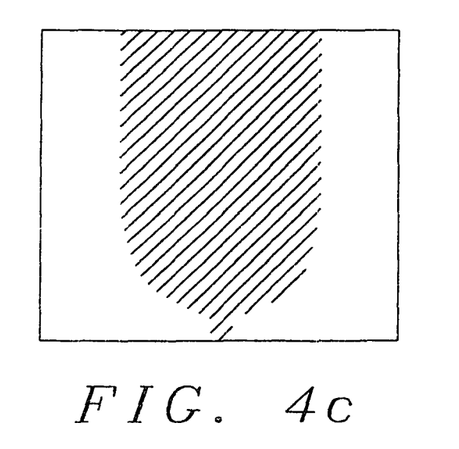

In FIG. 4c, the S1 section has parallel sides spaced between 0.1 and 1 microns apart, and extending in the Z direction for from 0.1 to 2 microns, while section S2 begins as a seamless extension of S1. However, after about 0.5 microns, the sides of S2 converge so as to form a parabola whose focus lies at the entrance to S3. The parabolic shape of S2 provides an alternate way to condense the gap plasmons. Section S3 has parallel sides spaced between 0.01 and 0.1 microns apart that extend for up to 0.2 microns all the way to the ABS.

Thus, the SGPG structure of the invention has a higher optical efficiency relative to a GPG having a uniform cross-section along the Z direction because of 1) the larger overlap between the WG and GP modes in the S1 section, 2) adiabatic focusing and condensing of the GP by the S2 section's tilted metal walls, and 3) the reduced propagation loss since most of the optical energy is in the dielectric gap.

The metal portion of the SGPG can be made of materials such as aluminum, gold, silver, copper, or their alloys (depending on the light's wavelength and the dielectric constant of the waveguide materials). A general guide is to choose a metal that supports a surface plasmon of relatively long propagating length (ca. 1-10 microns). Each section of the GPG structure can be independently designed to achieve its best optical efficiency. For example, the lateral dimension along the x-direction of the S1 section could be designed to match the size of the WG mode, while the side wall angle, the dimensions along the x-direction, and the distance along the z-direction of the S2 section could also be designed to allow adiabatic focusing of the GP as well as to minimize the propagation loss suffered by the GP as it travels along the z-direction. The existence of the S3 section means a better ABS lapping tolerance.

Figure 5A:
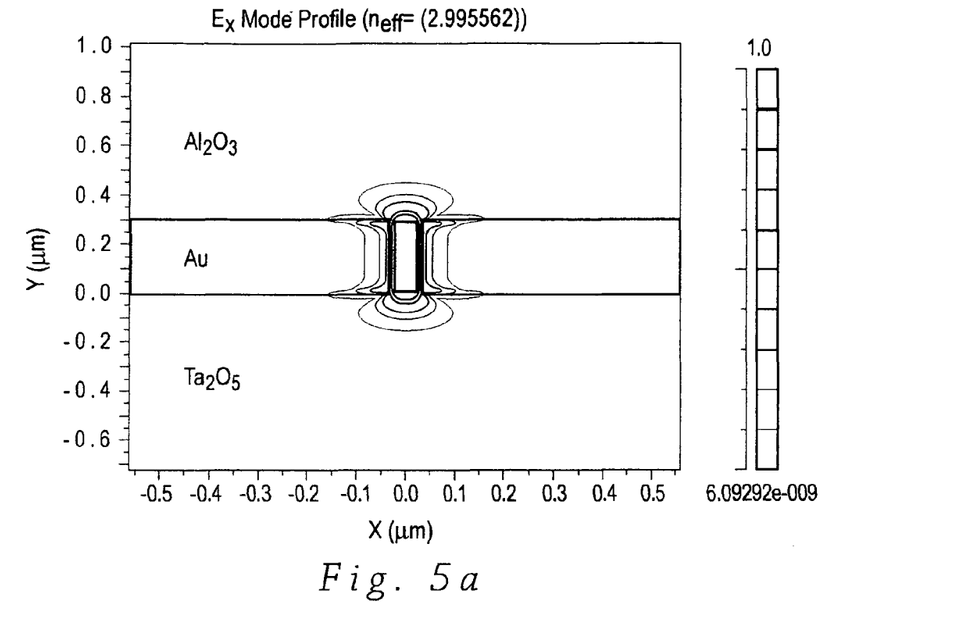
Figure 5B:
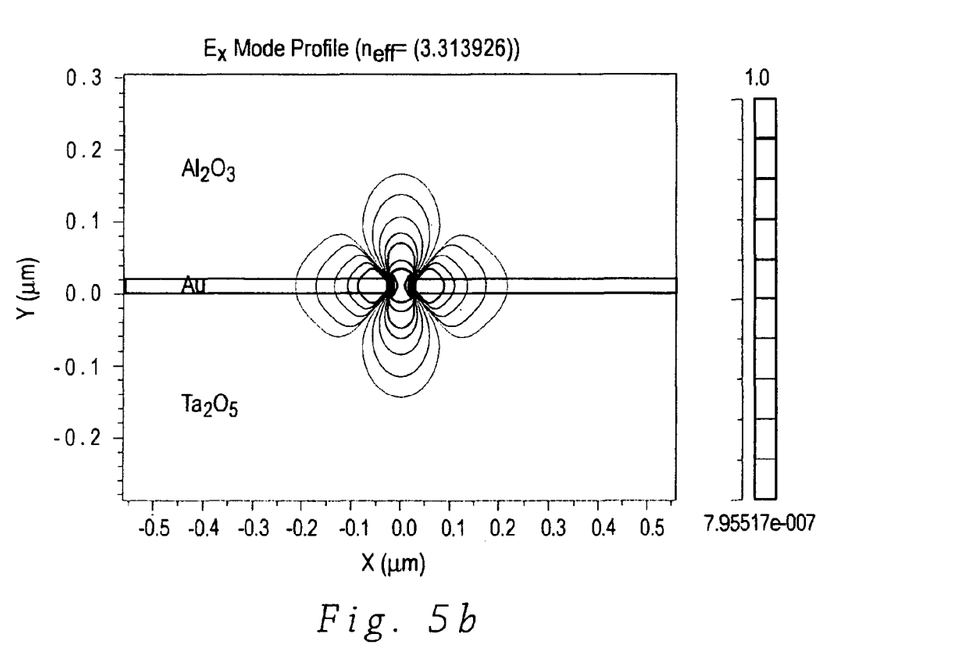
Figure 6A:
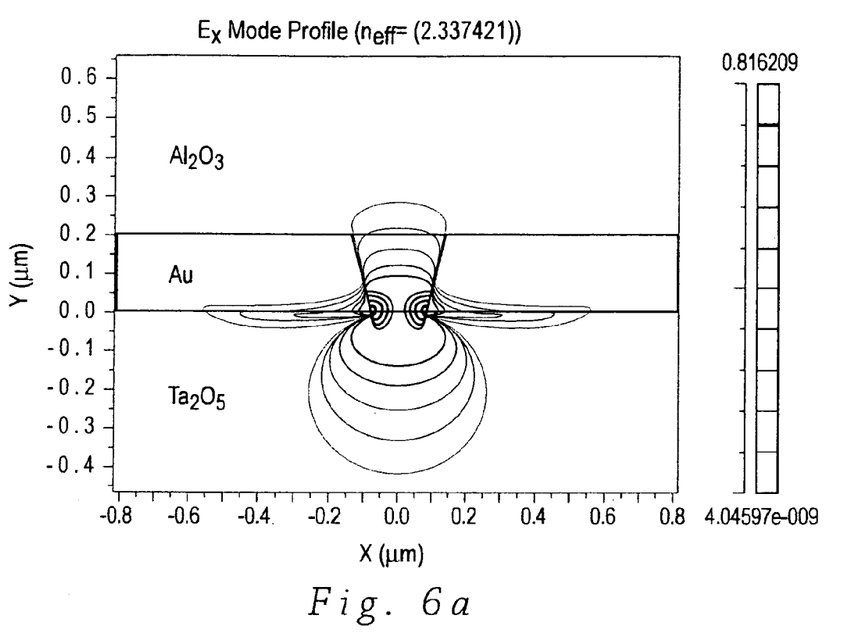
Figure 6B:
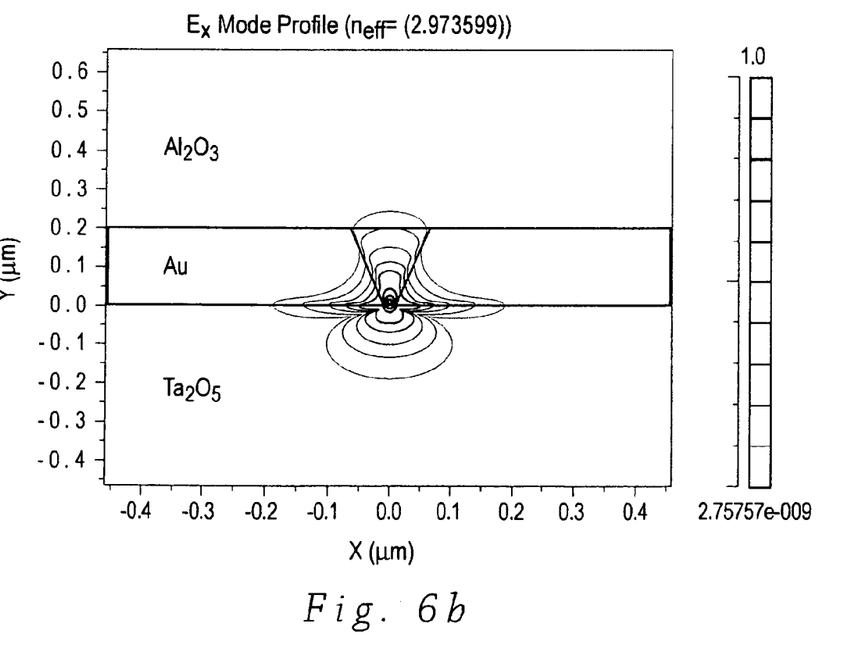

To illustrate the focusing effect in the x-y cross section, the GP modes have been calculated, using a Finite Element Method (FEM) mode solver, for the rectangular gap at greater and lesser thicknesses of a gold film, as shown in FIGS. 5a and 5b respectively, and for a wider and narrower trapezoidal gap, as shown in FIGS. 6a and 6b respectively. For the rectangular gap, a thicker gold film is unable to confine the GP mode in the y-direction. Although a thinner gold film with a smaller gap is able to confine the GP mode in both the x and y directions, the effective mode index increases significantly signifying that this highly confined mode is much more lossy. In principle, one could provide a metal thin film of gradually decreasing thickness as the GP propagates towards to the ABS, so that both efficiency and field confinement are achieved. However, the necessary fabrication process to implement this lies outside the scope of the present invention.

By using a trapezoidal shaped cross section, the GP mode becomes asymmetric, and the field is more confined to the narrower gap side. In fact, two Edge Plasmon (EP) modes could be excited and coupled with each other by the GP mode as shown in FIG. 6. Without changing the metal film thickness, the further confinement of the Asymmetric GP (AGP) mode in both x and y directions could readily be realized just by reducing the gap width.

To demonstrate the improved optical efficiency, a Finite-Difference Time-Domain (FDTD) method was employed to simulate full-wave electromagnetic coupling of the WG light into the PG structures. The simulation model included the optical wave-guide, the Plasmon generator, the cladding material surrounding WG and PG, and the air space at the ABS.

Two designs were evaluated: the uniform edge Plasmon generator with the same trapezoid cross-section and the self-focusing gap Plasmon generator with a gradually shrinking trapezoidal cross-section. For the EPG design, the TM WG mode is the excitation source while for the GPG, TE WG mode it is the excitation source. For the sake of simplicity, the straight sections S1 and S3 of the SGPG design have not been included in the model.

Figure 7A:
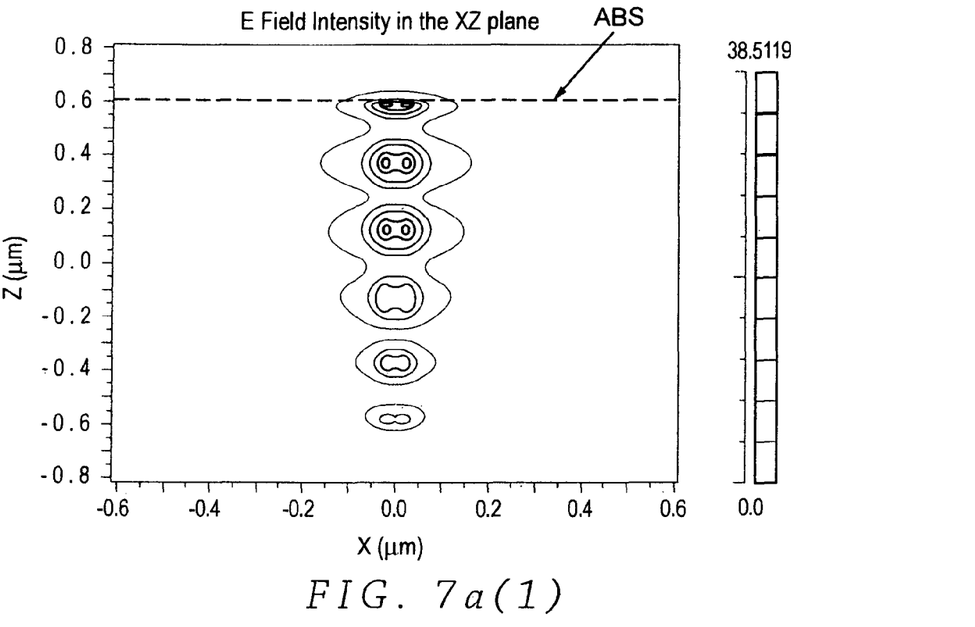
Figure 7B:
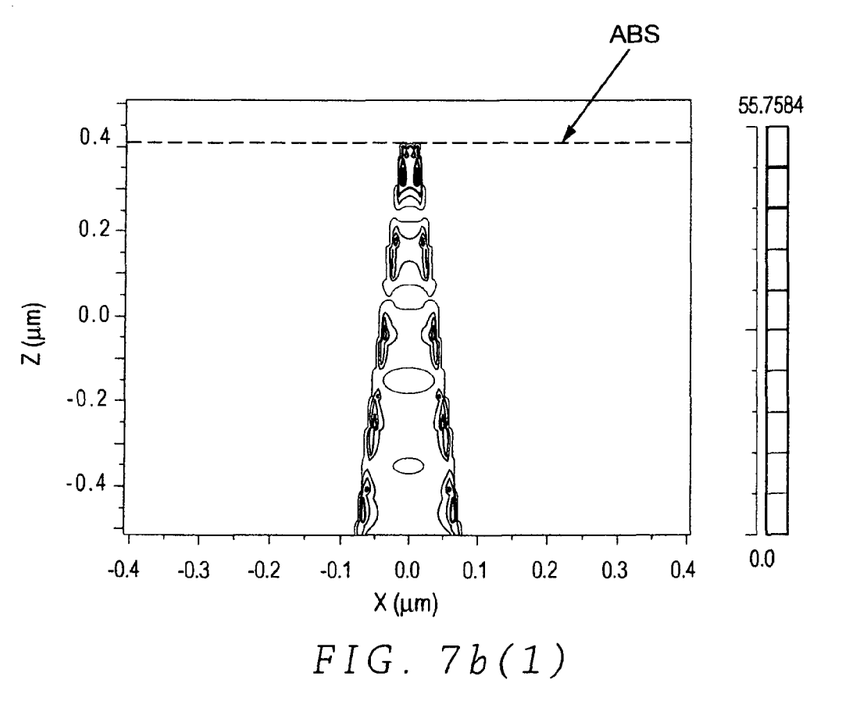
Figure 8A:
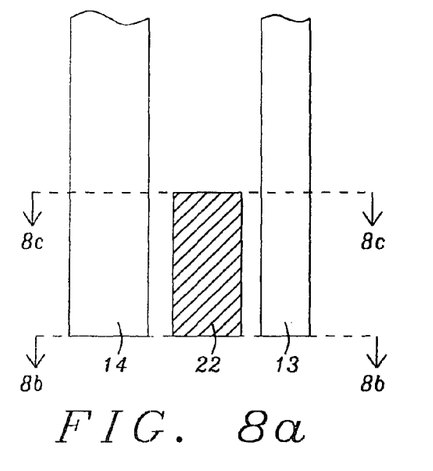
Figure 8B:
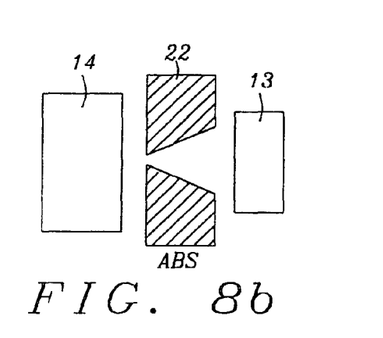
Figure 8C:
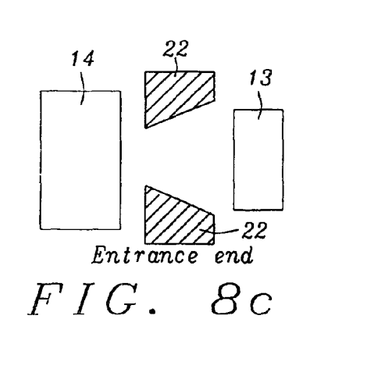
Figure 9A:
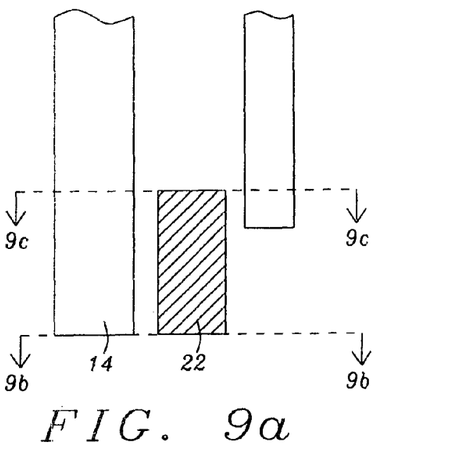
Figure 9B:
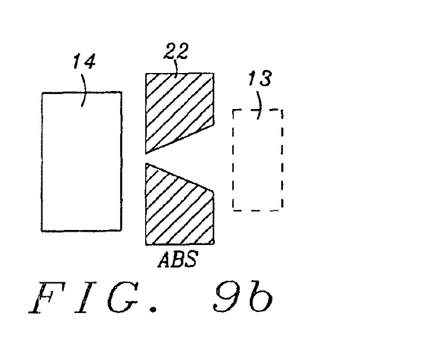
Figure 9C:
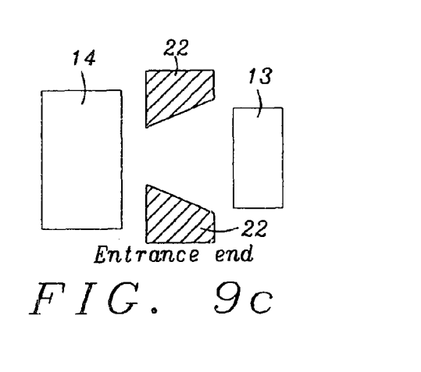
Figure 10A:
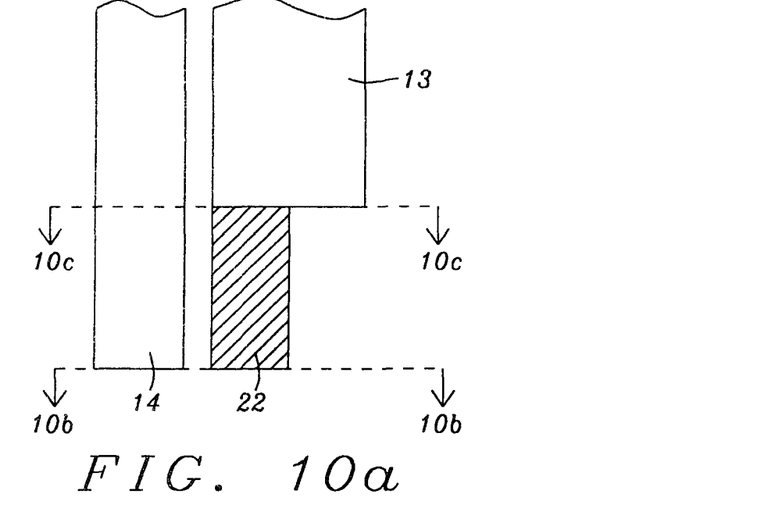
Figure 10B:
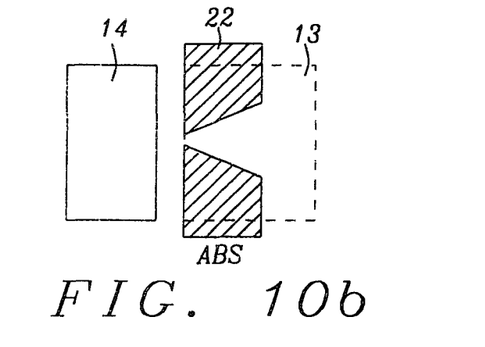
Figure 10C:
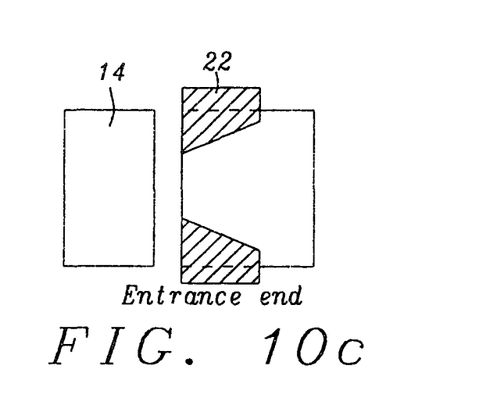

FIG. 7A shows simulation results for a uniform Plasmon generator structure as disclosed in the prior art. The three figures show, from left to right, the time-averaged electric field intensity distribution in the XZ plane 20 nm above the top surface of the PG, in the YZ plane through the middle of the PG, and in the XY plane at 20 nm from the ABS. The light wave coupling from the WG to the SP wave that forms a standing wave pattern due to reflection from the ABS end can be clearly seen in the cross-sectional views (left and middle figures) of intensity distribution. The field intensity distribution in the XY plane corresponds to the confined optical spot around the tip of the PG. The normalized peak intensity of 11.08 (see right-most scale bar in FIG. 7A) indicates the enhancement of the optical near field due to the relatively efficient delivery by the PG.

By way of comparison, FIG. 7B shows simulation results for the gradually shrinking trapezoidal cross-section design of the present invention. The focusing and confinement effect achieved by the GP in the y-direction is best seen in the YZ cross-sectional view (middle figure) as the electric field is more confined on one side of the gap. The focusing effect on the gap plasmons along the tapering direction of the GPG can be clearly seen in the XZ cross-sectional view (left figure). Since the GP energy is increasingly confined as it propagates toward the ABS, the intensity at the ABS is greatly enhanced.

At 20 nm from the ABS, the trapezoidal shaped GPG structure generates a peak intensity of 29.51, or ~2.8× improvement even without the straight S1 section that further improves the coupling efficiency to the WG light. The field intensity distribution also indicates a very small spot (less than 20 nm) along both x and y directions located at the 20 nm narrow gap side.

The modeling results shown in FIGS. 7A and 7B demonstrate the improvement of the asymmetric gap Plasmon generator over the prior art in terms of the peak intensity that is delivered by the PG and the optical near-field confinement as an addition. It clearly shows the tapered structure condenses the GP energy and the optical near field is enhanced as a consequence. Optimizing the design of the matching waveguide, including the straight S1 section, tuning the tapering angle and the length of S2 section, and tuning the flare angle of the trapezoidal cross-section are expected to further improve the overall efficiency of delivering optical energy from the laser diode to the hot spot in the medium.

Finally, we note that, in the present invention, coupling between the WG and SGPG is achieved via the Otto mode. However, one skilled in the art could readily substitute the Kretschmann mode should they so prefer.

Preferred Embodiments

Three embodiments of the invention are illustrated in FIGS. 8a-c, 9a-c, and 10a-c. Embodiments 1 and 2 are similar. In embodiment 1 (FIGS. 8a-c), the TAMR head has a magnetic write pole 14, gap Plasmon generator 22, and an optical wave guide 13. The magnetic writer pole 14 generates a magnetic field in the recording medium to switch the medium's grain magnetizations during recording. Plasmon generator 22 transmits in Plasmon mode towards the medium, producing local heating in the medium by its Plasmon electric field energy. This heating reduces the medium anisotropy field to enable an easier switching by the field from 14. Wave-guide 13 transmits an optical light wave into the TAMR head from outside and couples the optical mode to the gap Plasmon mode of 22. The narrower gap side of the Plasmon generator points towards the trailing direction of the TAMR head and directly faces the optical wave-guide 13 positioned further upstream with some spacing in between. The writer pole 14, Plasmon generator 22 and waveguide 13 are fully exposed at the ABS of the TAMR head, The Plasmon generator can use the shapes shown in FIGS. 3 and 4.

Embodiment 2 (FIGS. 9a-c) is the same as Embodiment 1 except that wave-guide 13 is recessed from the ABS so, in this configuration, coupling between Plasmon generator 22 and wave-guide 13 occurs where the two structures overlap.

Embodiment 3 (FIGS. 10a, 10b, and 10c) is the same as Embodiment 1 except that wave-guide 13 is not only recessed from the ABS, but is also located behind the entrance of Plasmon generator 22. In this configuration, the optical energy is directly coupled from the waveguide mode to the gap Plasmon mode.

DIFFERENCES AND ADVANTAGES

The main differences between the Self-focusing Gap Plasmon Generator of the present invention and the edge Plasmon generator of the prior art and their consequent advantages include:

1. Normally an Edge Plasmon generator needs a TM mode LD. This is a non-standard item and therefore expensive. However, the SGPG of the present invention can use a TE mode LD. This is readily available and therefore cheaper.

2. The SGPG has a three dimensional self-focusing shape while the EPG has a uniform cross section. Because of this, the SGPG has the following advantages:

(i) Improved optical efficiency due to the better coupling efficiency of the WG light into GP mode as a result of the large overlap with the wave-guide.

(ii) Less power is required to operate the laser diode because of (i) above.

(iii) Similarly, there is reduced power dissipation by the Plasmon Generator.

(iv) Better temperature distribution inside the Plasmon Generator due to the large volume of the metal film. If needed, the latter could be further extended laterally.

(v) Easier optimum placement and alignment of the optical hot spot relative to the magnetic write pole.

What is claimed is:

1. A thermally assisted perpendicular magnetic recording system for a magnetic recording medium, comprising:

a slider having parallel top and bottom surfaces, separated from one another along a Z direction, said bottom surface being an air bearing surface (ABS);

between said top and bottom surfaces, a perpendicular magnetic pole (PMP) that terminates at said ABS;

a laser diode (LD) that is operating in TE (Transverse Electric) mode mounted on said top surface, disposed so as to emit a TE mode light beam in said Z direction;

an optical wave-guide (WG), operating in TE mode that extends from said top surface towards said lower surface along said Z direction, aligned for optimum coupling to said TE mode light beam;

a self-focusing gap plasmon generator (SGPG), oriented to lie along said Z direction between said PMP and said WG whereby said SGPG has a WG-facing surface and a PMP-facing surface that are separated from one another along a Y direction that is perpendicular to said Z direction;

said SGPG comprising first, second, and third sections, that are interconnected, each section having at least two inner surfaces and each section further comprising a pair of metallic regions, that are a separation distance apart, connected to one another through a dielectric region along an X direction that is perpendicular to both said Z direction and said Y direction;

said separation distance decreasing both when going from said WG-facing surface to said PMP-facing surface as well as when going towards said ABS along said Z direction; and wherein said WG is displaced from said SGPG in said Y direction, by up to 0.1 microns, and overlaps said SGPG, terminating between 0 and 1 microns from said ABS, whereby edge coupling of radiation, occurs between said SGPG and said WG;

whereby optical radiation propagating through said WG in said TE mode is coupled into said SGPG, emerging at said ABS as focused plasmon radiation that heats said magnetic recording medium over an area measuring less than 50 nm across and located within 0.1 microns from said PMP.

2. The thermally assisted perpendicular magnetic recording system described in claim 1 further comprising, as viewed from the Y direction:

said first section having parallel sides spaced between 0.1 and 1 microns apart and extending from 0.05 to 2 microns in the Z direction;

said second section having non-parallel sides whose separation, when going from said first section to said third section, decreases from between 0.1 and 1 microns to between 0.01 and 0.1 microns, said first and third sections being between 0.1 and 2 microns apart; and said third section having parallel sides spaced between 0.01 and 0.1 microns apart that extend for up to 0.2 microns to said ABS.

3. The thermally assisted perpendicular magnetic recording system described in claim 1 further comprising, as viewed from the Y direction:

said first section having parallel sides spaced between 0.1 and 1 microns apart and extending from 0.05 to 2 microns in the Z direction;

said second section having parallel sides spaced between 0.2 and 1.6 microns apart and extending from 0.1 to 2 microns in the Z direction, whereby said second section functions as a gap plasmon resonator; and said third section having parallel sides spaced between 0.01 and 0.1 microns apart that extend for up to 0.2 microns to said ABS.

4. The thermally assisted perpendicular magnetic recording system described in claim 1 further comprising, as viewed from the Y direction:

said first section having parallel sides spaced between 0.2 and 1.6 microns apart and extending from 0.1 to 2 microns in the Z direction;

said second section having parallel sides spaced between 0.1 and 1 microns apart and extending from 0.05 to 2 microns in the Z direction, whereby said second section functions as a gap plasmon resonator; and said third section having parallel sides spaced between 0.01 and 0.1 microns apart that extend for up to 0.2 microns to said ABS.

5. The thermally assisted perpendicular magnetic recording system described in claim 1 further comprising, as viewed from the Y direction:

said first section having parallel sides spaced between 0.1 and 1 microns apart and extending from 0.1 to 2 microns in the Z direction;

said second section having a first part that is an extension of said first section and a second part whose sides converge to form a parabola whose focus is at an entrance to a third section; and said third section having parallel sides spaced between 0.01 and 0.1 microns apart that extend up to 0.2 microns to said ABS.

6. A method to thermally assist perpendicular magnetic recording in a magnetic medium, comprising:

providing a slider having parallel top and bottom surfaces that are separated from one another along a Z direction, said bottom surface being an air bearing surface (ABS);

inserting, between said top and bottom surfaces, a perpendicular magnetic pole (PMP) that terminates at said ABS;

mounting a laser diode (LD) that is operating in TE (Transverse Electric) mode) on said top surface, disposed so as to emit a light beam in said Z direction;

providing an optical wave-guide (WG) that extends from said top surface towards said lower surface along said Z direction and aligning said WG for optimum coupling to said light beam in said TE mode;

placing a self-focusing gap plasmon generator (SGPG) between said PMP and said WG and orienting said SGPG to lie along said Z direction whereby said SGPG has a WG-facing surface and a PMP-facing surface, said surfaces being separated from one another along a Y direction that is perpendicular to said Z direction;

including, as part of said SGPG, first, second, and third sections, that are interconnected, and providing each such section with at least two inner surfaces and with a pair of metallic regions that are a separation distance apart and that are connected to one another through a dielectric region along an X direction that is perpendicular to both said Z direction and said Y direction;

shaping said separation distance so that it decreases both when going from said WG-facing surface to said PMP-facing surface as well as when going towards said ABS along said Z direction; and wherein said WG is displaced from said SGPG in said Y direction, by up to 0.1 microns, and overlaps said SGPG, terminating up to 1 micron from said ABS, whereby edge coupling of radiation occurs between said SGPG and said WG;

coupling optical radiation in said TE mode from said WG into said SGPG so as to cause focused plasmon radiation to emerge from said SGPG at said ABS, thereby heating said magnetic medium over an area measuring less than 50 nm across and located within 0.1 microns from said PMP.

7. The method recited in claim 6 further comprising, as viewed from the Y direction:

said first section having parallel sides spaced between 0.1 and 1 microns apart and extending from 0.05 to 2 microns in the Z direction;

said second section having non-parallel sides whose separation, when going from said first section to said third section, decreases from between 0.1 and 1 microns to between 0.01 and 0.1 microns, said first and third sections being between 0.1 and 2 microns apart; and said third section having parallel sides spaced between 0.01 and 0.1 microns apart that extend for up to 0.2 microns to said ABS.

8. The method recited in claim 6 further comprising, as viewed from the Y direction:

said first section having parallel sides spaced between 0.1 and 1 microns apart and extending from 0.05 to 2 microns in the Z direction;

said second section having parallel sides spaced between 0.2 and 1.6 microns apart and extending from 0.1 to 2 microns in the Z direction, whereby said second section functions as a second gap plasmon resonator; and said third section having parallel sides spaced between 0.01 and 0.1 microns apart that extend for up to 0.1 microns right to said ABS.

9. The method recited in claim 6 further comprising, as viewed from the Y direction:

said first section having parallel sides spaced between 0.2 and 1.6 microns apart and extending from 0.1 to 2 microns in the Z direction;

said second section having parallel sides spaced between 0.1 and 1 microns apart and extending from 0.05 to 2 microns in the Z direction, whereby said second section functions as a gap plasmon resonator; and said third section having parallel sides spaced between 0.01 and 0.1 microns apart that extend for up to 0.2 microns to said ABS.

10. The method recited in claim 6 further comprising, as viewed from the Y direction:

said first section having parallel sides spaced between 0.1 and 1 microns apart and extending from 0.1 to 2 microns in the Z direction;

said second section having a first part that is an extension of said first section and a second part whose sides converge to form a parabola whose focus is at an entrance to a third section; and said third section having parallel sides spaced between 0.01 and 0.1 microns apart that extend for up to 0.2 microns to said ABS.

11. A thermally assisted perpendicular magnetic recording system for a magnetic recording medium, comprising:

a slider having parallel top and bottom surfaces, separated from one another along a Z direction, said bottom surface being an air bearing surface (ABS);

between said top and bottom surfaces, a perpendicular magnetic pole (PMP) that terminates at said ABS;

a laser diode (LD) that is operating in TE (Transverse Electric) mode mounted on said top surface, disposed so as to emit a TE mode light beam in said Z direction;

an optical wave-guide (WG), operating in TE mode that extends from said top surface towards said lower surface along said Z direction, aligned for optimum coupling to said TE mode light beam;

a self-focusing gap plasmon generator (SGPG), oriented to lie along said Z direction between said PMP and said WG whereby said SGPG has a WG-facing surface and a PMP-facing surface that are separated from one another along a Y direction that is perpendicular to said Z direction;

said SGPG comprising first, second, and third sections, that are interconnected, each section having at least two inner surfaces and each section further comprising a pair of metallic regions, that are a separation distance apart, connected to one another through a dielectric region along an X direction that is perpendicular to both said Z direction and said Y direction;

said separation distance decreasing both when going from said WG-facing surface to said PMP-facing surface as well as when going towards said ABS along said Z direction; and wherein said SGPG lies directly below and within 0.2 microns of said WG whereby direct coupling of radiation occurs between said SGPG and said WG whereby optical radiation propagating through said WG in said TE mode is coupled into said SGPG, emerging at said ABS as focused plasmon radiation that heats said magnetic recording medium over an area measuring less than 50 nm across and located within 0.1 microns from said PMP.

12. The thermally assisted perpendicular magnetic recording system described in claim 11 further comprising, as viewed from the Y direction:

said first section having parallel sides spaced between 0.1 and 1 microns apart and extending from 0.05 to 2 microns in the Z direction;

said second section having non-parallel sides whose separation, when going from said first section to said third section, decreases from between 0.1 and 1 microns to between 0.01 and 0.1 microns, said first and third sections being between 0.1 and 2 microns apart; and said third section having parallel sides spaced between 0.01 and 0.1 microns apart that extend for up to 0.2 microns to said ABS.

13. The thermally assisted perpendicular magnetic recording system described in claim 11 further comprising, as viewed from the Y direction:

said first section having parallel sides spaced between 0.1 and 1 microns apart and extending from 0.05 to 2 microns in the Z direction;

said second section having parallel sides spaced between 0.2 and 1.6 microns apart and extending from 0.1 to 2 microns in the Z direction, whereby said second section functions as a gap plasmon resonator; and said third section having parallel sides spaced between 0.01 and 0.1 microns apart that extend up to 0.2 microns to said ABS.

14. The thermally assisted perpendicular magnetic recording system described in claim 11 further comprising, as viewed from the Y direction:

said first section having parallel sides spaced between 0.2 and 1.6 microns apart and extending from 0.1 to 2 microns in the Z direction;

said second section having parallel sides spaced between 0.1 and 1 microns apart and extending from 0.05 to 2 microns in the Z direction, whereby said second section functions as a gap plasmon resonator; and said third section having parallel sides spaced between 0.01 and 0.1 microns apart that extend for up to 0.2 microns to said ABS.

15. The thermally assisted perpendicular magnetic recording system described in claim 11 further comprising, as viewed from the Y direction:

said first section having parallel sides spaced between 0.1 and 1 microns apart and extending from 0.1 to 2 microns in the Z direction;

said second section having a first part that is an extension of said first section and a second part whose sides converge to form a parabola whose focus is at an entrance to a third section; and said third section having parallel sides spaced between 0.01 and 0.1 microns apart that extend for up to 0.2 microns to said ABS.

16. A method to thermally assist perpendicular magnetic recording in a magnetic medium, comprising:

providing a slider having parallel top and bottom surfaces that are separated from one another along a Z direction, said bottom surface being an air bearing surface (ABS);

inserting, between said top and bottom surfaces, a perpendicular magnetic pole (PMP) that terminates at said ABS;

mounting a laser diode (LD) that is operating in TE (Transverse Electric) mode) on said top surface, disposed so as to emit a light beam in said Z direction;

providing an optical wave-guide (WG) that extends from said top surface towards said lower surface along said Z direction and aligning said WG for optimum coupling to said light beam in said TE mode;

placing a self-focusing gap plasmon generator (SGPG) between said PMP and said WG and orienting said SGPG to lie along said Z direction whereby said SGPG has a WG-facing surface and a PMP-facing surface, said surfaces being separated from one another along a Y direction that is perpendicular to said Z direction;

including, as part of said SGPG, first, second, and third sections, that are interconnected, and providing each such section with at least two inner surfaces and with a pair of metallic regions that are a separation distance apart and that are connected to one another through a dielectric region along an X direction that is perpendicular to both said Z direction and said Y direction;

shaping said separation distance so that it decreases both when going from said WG-facing surface to said PMP-facing surface as well as when going towards said ABS along said Z direction; and wherein said SGPG lies directly below, and within 0.2 microns from said WG whereby direct coupling of radiation occurs between said SGPG and said WG coupling optical radiation in said TE mode from said WG into said SGPG so as to cause focused plasmon radiation to emerge from said SGPG at said ABS, thereby heating said magnetic medium over an area measuring less than 50 nm across and located within 0.1 microns from said PMP.

17. The method recited in claim 16 further comprising, thermally assisted perpendicular magnetic recording system described in claim 7 further comprising, as viewed from the Y direction:

said first section having parallel sides spaced between 0.1 and 1 microns apart and extending from 0.05 to 2 microns in the Z direction;

said second section having non-parallel sides whose separation, when going from said first section to said third section, decreases from between 0.1 and 1 microns to between 0.01 and 0.1 microns, said first and third sections being between 0.1 and 0.2 microns apart; and said third section having parallel sides spaced between 0.01 and 0.1 microns apart that extend for up to 0.2 microns to said ABS.

18. The method recited in claim 16 further comprising, as viewed from the Y direction:

said first section having parallel sides spaced between 0.1 and 1 microns apart and extending from 0.05 to 2 microns in the Z direction;

said second section having parallel sides spaced between 0.2 and 1.6 microns apart and extending from 0.1 to 2 microns in the Z direction, whereby said second section functions as a gap plasmon resonator; and said third section having parallel sides spaced between 0.01 and 0.1 microns apart that extend for up to 0.2 microns to said ABS.

19. The method recited in claim 16 further comprising, as viewed from the Y direction:

said first section having parallel sides spaced between 0.2 and 1.6 microns apart and extending from 0.1 to 2 microns in the Z direction;

said second section having parallel sides spaced between 0.1 and 1 microns apart and extending from 0.05 to 2 microns in the Z direction, whereby said second section functions as a gap plasmon resonator; and said third section having parallel sides spaced between 0.01 and 0.1 microns apart that extend for up to 0.2 microns to said ABS.

20. The method recited in claim 16 further comprising, as viewed from the Y direction:

said first section having parallel sides spaced between 0.1 and 1 microns apart and extending from 0.1 to 2 microns in the Z direction;

said second section having a first part that is an extension of said first section and a second part whose sides converge to form a parabola whose focus is at an entrance to a third section; and said third section having parallel sides spaced between 0.01 and 0.1 microns apart that extend for up to 0.2 microns to said ABS.

* * * * *